United States Patent
Fukuta et al.

(10) Patent No.: US 10,484,902 B2
(45) Date of Patent: Nov. 19, 2019

(54) COMMUNICATION APPARATUS, DATA PROCESSING SYSTEM, AND COMMUNICATION METHOD

(71) Applicant: FUJITSU LIMITED, Kawasaki-shi, Kanagawa (JP)

(72) Inventors: Shigeki Fukuta, Setagaya (JP); Yuki Nishiguchi, Kawasaki (JP); Ai Yano, Kawasaki (JP); Nami Nagata, Kawasaki (JP); Jun Kakuta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/982,759

(22) Filed: May 17, 2018

(65) Prior Publication Data

US 2018/0338255 A1    Nov. 22, 2018

(30) Foreign Application Priority Data

May 19, 2017    (JP) .................................. 2017-099957

(51) Int. Cl.
*H04L 12/50* (2006.01)
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ...................................... H04L 12/28
USPC .......................................... 370/329
See application file for complete search history.

(56) References Cited

U.S. PATENT DOCUMENTS

| 2007/0271373 | A1  | 11/2007 | Matsumoto et al. |
| 2018/0204381 | A1* | 7/2018  | Kanatsu ............... H04N 13/282 |

FOREIGN PATENT DOCUMENTS

| JP | 2002-169732 | 6/2002 |
| JP | 2007-310762 | 11/2007 |
| JP | 2012-186667 | 9/2012 |

* cited by examiner

*Primary Examiner* — Dang T Ton
(74) *Attorney, Agent, or Firm* — Fujitsu Patent Center

(57) ABSTRACT

A gateway which is an example of a communication device includes a selecting unit and a management data collecting unit. The selecting unit selects a collection manipulation within a range not exceeding a resource amount allocated to transmission of management data among all resources of wireless communication usable by a device in accordance with an evaluation value. The evaluation value is a value calculated on the basis of a contribution degree to failure analysis and consumption resources for each of a plurality of collection manipulations for collecting management data used for the failure analysis from a device. The management data collecting unit executes the collection manipulation selected by the selecting unit on the device and collects the management data corresponding to the collection manipulation from the device through the wireless communication.

6 Claims, 13 Drawing Sheets

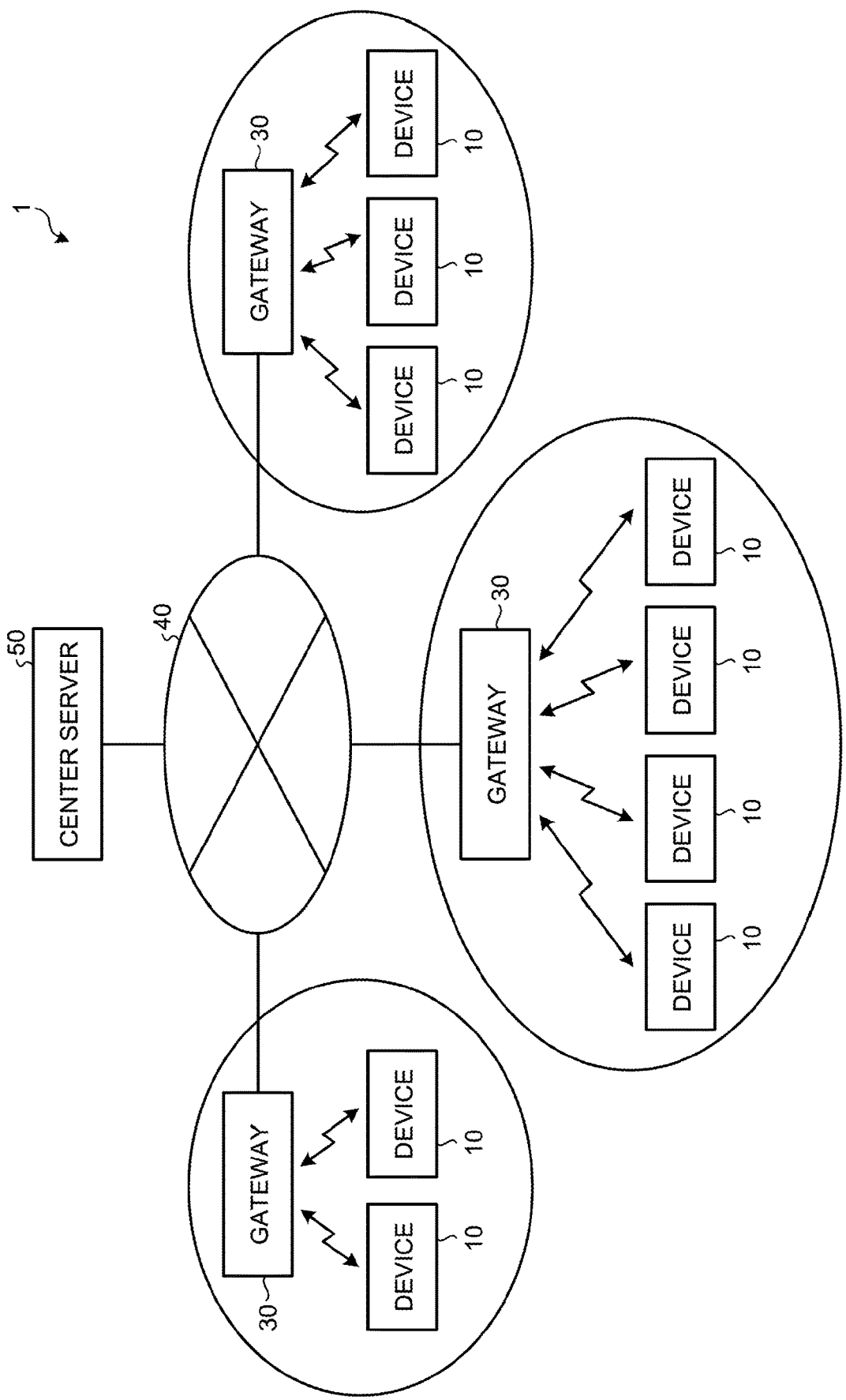

FIG.2

| CATEGORY | ACQUISITION TARGET INFORMATION | REMARKS |
|---|---|---|
| HARDWARE INFORMATION | INTERNAL PROCESSING TIME | REQUIRED TIME OF EACH PROCESS (SUCH AS ACTIVATION, CONNECTION, AUTHENTICATION, DATA GENERATION, AND RECEPTION DATA PROCESSING) |
| | CPU USAGE | CPU USAGE RATE (RATE AT WHICH PROGRAM BEING EXECUTED IS OCCUPYING PROCESSING TIME OF CPU) |
| | MEMORY USAGE | MEMORY USAGE RATE (RATE OF USED MEMORY OF SYSTEM) |
| | HDD USAGE | HDD USAGE AMOUNT (RATE OF USED CAPACITY OF HARD DISC) |
| | DEVICE STATUS | DEVICE STATUS (SUCH AS ON/OFF) |
| | RESPONSE TIME | RESPONSE TIME (ELAPSED TIME UNTIL ACK IS RECEIVED AFTER DATA TRANSMISSION) |
| | TIMEOUT ERROR | TIMEOUT ERROR (ERROR WHEN TIME LIMIT IS EXCEEDED UNTIL ACK IS RECEIVED AFTER DATA TRANSMISSION) |
| | CHANNEL UTILIZATION RATIO | CHANNEL UTILIZATION RATIO (USAGE RATIO [%] OF CHANNEL OF TIME CONSUMED FOR TRANSMISSION AND RECEPTION OF FRAME) |
| | NUMBER OF ASSOCIATED DEVICES | NUMBER OF ASSOCIATED DEVICES (NUMBER OF DEVICES ASSOCIATED WITH DESIGNATED AP/COORDINATOR) |
| | NUMBER OF ACTIVE NODES | NUMBER OF ACTIVE NODES (NUMBER OF DEVICES PERFORMING COMMUNICATION WITHIN SPECIFIC PERIOD OF TIME) |
| COMMUNICATION INFORMATION | RSSI | RSSI (STRENGTH [dBm] OF SIGNAL RECEIVED BY WIRELESS COMMUNICATION DEVICE) |
| | LQ/SQ | LINK QUALITY/SIGNAL QUALITY (CALCULATED FROM SIGNAL AND NOISE STRENGTH WHEN FRAME IS RECEIVED [0 TO 255]) |
| | PER | PER (AVERAGE RATE OF TRANSMITTED PACKETS WHICH ARE NOT PROPERLY RECEIVED) |
| | RETRANSMISSION COUNTER | RETRANSMISSION COUNTER (TIME OF FRAME BEING TRANSMITTED) |
| | ERROR MESSAGE/CODE | ACQUIRE ERROR MESSAGE/COMMAND OF EACH LAYER OF ERROR MESSAGE AND COMMAND WHICH CAN BE ACQUIRED FOR EACH COMMUNICATION SCHEME |
| | CHANNEL SCAN RESULTS REPORT | CHANNEL SCAN RESULT REPORT (CHANNEL SCAN REPORT INCLUDING SCAN TYPE, SCAN CHANNEL LIST, ENERGY DETECTION LIST, AND PAN/NETWORK DESCRIPTOR LIST) |
| | BATTERY POWER | BATTER LEVEL [%] |
| PERIPHERAL INFORMATION | TEMPERATURE AROUND | AMBIENT TEMPERATURE |
| | SYSTEM LOG | SYSTEM LOG/OUTPUT BY SELF-DIAGNOSIS PROGRAM (SUCH AS NON-HDD ACCESSIBLE OR APPLICATION OPERATION STATE) |
| | SPECIFICATION | SPECIFICATIONS (SUCH AS TYPE, TOPOLOGY, INSTALLATION PLACE, DEVICE ACCESS, DEVICE CAPABILITY, AND OPERATION TIMING) |

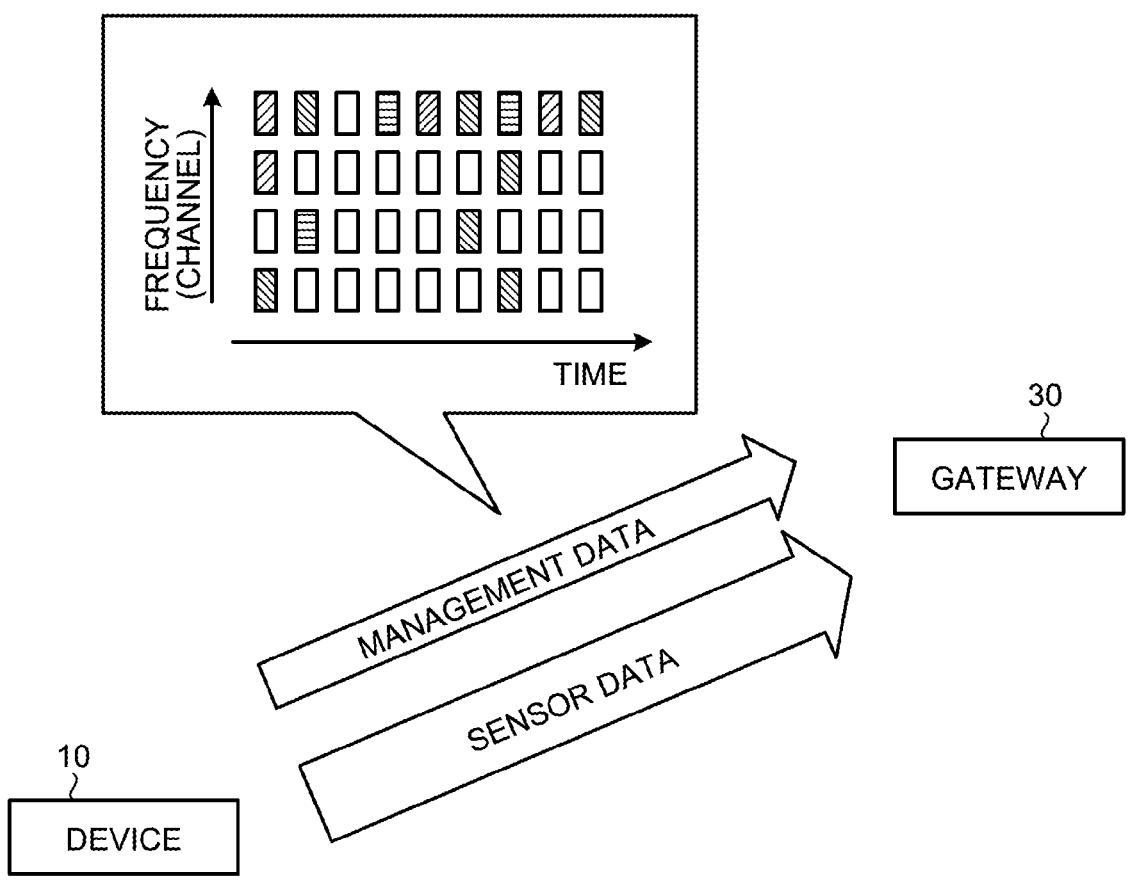

| COLLECTION MANIPULATION | MANAGEMENT DATA | CONSUMPTION RESOURCE AMOUNT B |
|---|---|---|
| PING | $x_1$: RESPONSE TIME [RT] | 1 ch×8 msec |
| BEACON | $x_2$: RADIO FIELD STRENGTH [RSSI]<br>$x_3$: LINK QUALITY [LQ] | 1 ch×4 msec |
| MANIPULATION X | $x_2$: RADIO FIELD STRENGTH [RSSI] | 1 ch×3 msec |
| MANIPULATION Y | $x_3$: LINK QUALITY [LQ] | 1 ch×3 msec |

| MANAGEMENT DATA | DEVICE | LATEST VALUE | MINIMUM VALUE | MAXIMUM VALUE | DIFFER-ENCE | CONTRIBUTION DEGREE |
|---|---|---|---|---|---|---|
| $x_1$: RESPONSE TIME [RT] | D1 | 120.0 | 30.0 | 120.0 | 90.0 | 2.1 |
| $x_2$: RADIO FIELD STRENGTH [RSSI] | D1 | 5.0 | 2.0 | 6.0 | 4.0 | 5.9 |
| $x_3$: LINK QUALITY [LQ] | D1 | 255 | 230 | 255 | 25 | 0.5 |
| ⋮ | ⋮ | ⋮ | ⋮ | ⋮ | ⋮ | ⋮ |

| COLLECTION MANIPULATION | CONSUMPTION RESOURCE AMOUNT | SELECTION EVALUATION VALUE |
|---|---|---|
| PING | 1 ch×8 msec | 2.5 |
| BEACON | 1 ch×4 msec | 3 |
| ⋮ | ⋮ | ⋮ |

| COLLECTION CYCLE | UPPER LIMIT OF AVAILABLE RESOURCE AMOUNT |
|---|---|
| FIRST CYCLE (EVERY SECOND) | 1 ch×10 msec |
| SECOND CYCLE (EVERY MINUTE) | 1 ch×500 msec |
| THIRD CYCLE (EVERY HOUR) | 1 ch×1000 msec |

US 10,484,902 B2

COMMUNICATION APPARATUS, DATA PROCESSING SYSTEM, AND COMMUNICATION METHOD

CROSS-REFERENCE TO RELATED APPLICATION

This application is based upon and claims the benefit of priority of the prior Japanese Patent Application No. 2017-099957, filed on May 19, 2017, the entire contents of which are incorporated herein by reference.

FIELD

The embodiments discussed herein are related to a communication device, a data processing system, and a communication method.

BACKGROUND

In the past, a network monitoring system which includes a main network to which a network device is connected in a wired manner and a monitoring network to which a monitoring terminal and a monitoring server are connected in a wired manner and is capable of detecting a state of a main network through any one monitoring device has been known. In the network monitoring system, a traffic state of the network device is detected, a path in which a usage amount is a certain threshold value or less, and there is a margin for a bandwidth amount is selected, and management data is collected using selected path. As described above, control is performed such that the traffic of the network device and the collection of the network state do not conflict by selecting a path with a sufficient margin from a plurality of path patterns. Conventional technique is described in Japanese Laid-open Patent Publication No. 2002-169732.

Further, in recent years, Internet of Things (IoT) solutions for detecting and controlling device abnormality using information from sensors installed in various places have been spreading. In devices which are used for IoT and collect sensor data detected by sensors and wirelessly transmit the sensor data, it is desirable to implement cost reduction. For this reason, it is difficult to install a plurality of communication units in the device, and it is difficult to apply the techniques of the related art described above to the IoT devices. Further, in order to enable failure analysis in a case in which communication failure occurs in each device, management data related to communication with each device is regularly collected. Among the management data, data fluctuating in a short time such as data related to wireless communication environments are collected with a short cycle. Further, since the management data is diverse, if all management data is collected with a short cycle, radio resources for collecting sensor data are pressurized. Therefore, it is difficult to collect detail management data used for failure analysis with a short cycle while securing the radio resources of the sensor data transmitted from the device.

SUMMARY

According to an aspect of an embodiment, a communication device includes a selection unit and a management data collecting unit. The selection unit selects a collection manipulation within a range not exceeding a resource amount allocated to transmission of management data among all resources of wireless communication usable by a device in accordance with an evaluation value calculated based on a contribution degree to failure analysis and consumption resources for each of a plurality of collection manipulations for collecting the management data used for the failure analysis from the device. The management data collecting unit executes the collection manipulation selected by the selecting unit on the device and collects the management data corresponding to the collection manipulation from the device through the wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a data processing system according to a first embodiment;

FIG. 2 is a diagram illustrating an example of a type of management data;

FIG. 3 is a diagram schematically illustrating a state of transmission of management data according to the first embodiment;

FIG. 6 is a diagram illustrating an example of collection manipulation information according to the first embodiment;

FIG. 7 is a diagram illustrating an example of priority calculation information according to the first embodiment;

DESCRIPTION OF EMBODIMENT(S)

Figure 4:
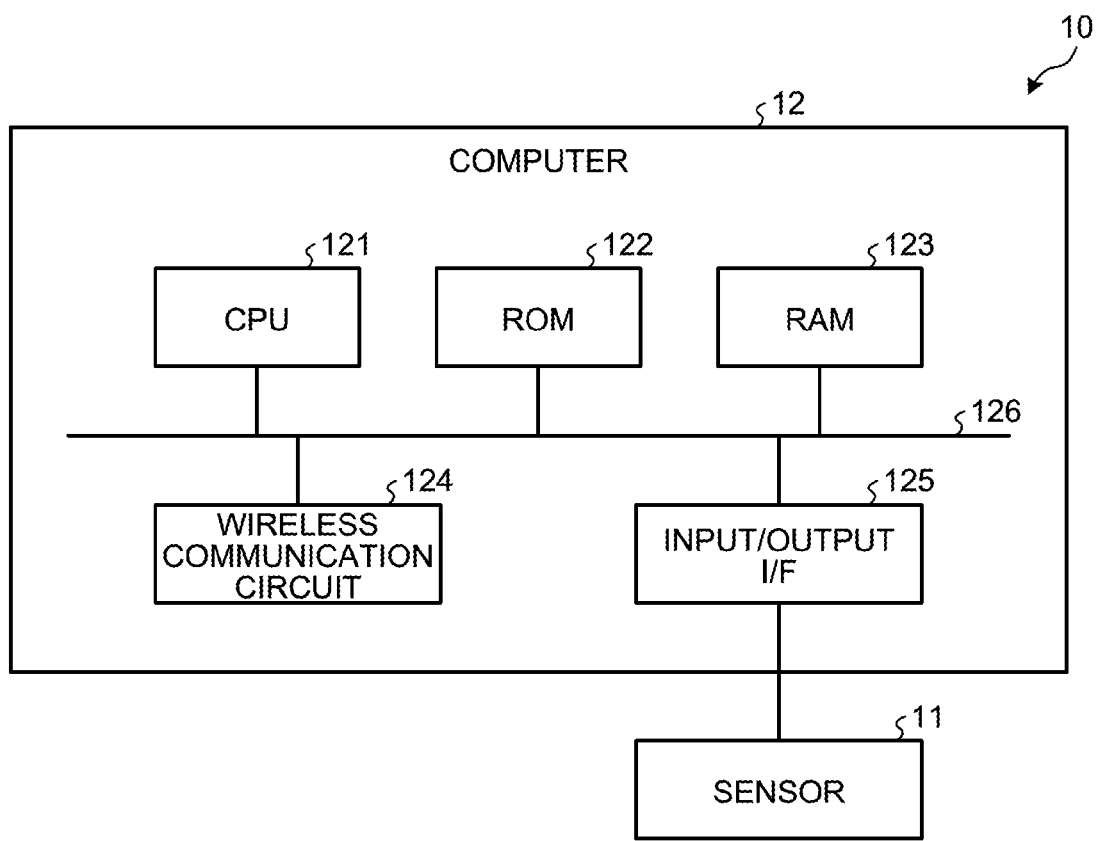
FIG. 4 is a diagram illustrating an example of hardware of a device according to the first embodiment.

Preferred embodiments of the present invention will be explained with reference to accompanying drawings. The disclosed technology is not limited by the following embodiments.

[a] First Embodiment

Data Processing System 1

FIG. 1 is a diagram illustrating an example of a data processing system according to a first embodiment. The data processing system 1 includes a plurality of gateways 30, a plurality of devices 10 which are wirelessly connected to the respective gateways 30, and a center server 50. Further, the gateway 30 and the center server 50 are connected via a network 40. Hereinafter, in a case in which a plurality of gateways 30 are collectively referred to without being distinguished from one another, the gateways 30 are referred to simply as a gateway 30, and in a case in which a plurality of devices 10 are collectively referred to without being distinguished from one another, devices 10 are referred to simply as a device 10.

The device 10 has a wireless communication function and is connected to a sensor which measures temperature, humidity, rainfall, or the like. The device 10 performs wireless communication with the gateway 30 using the wireless communication function. The device 10 performs wireless communication in accordance with a wireless communication standard such as a wireless local area network (LAN), Bluetooth (registered trademark), or ZIGBEE (registered trademark).

The gateway 30 is connected to the device 10 and the network 40 and relays communication between the center server 50 and the device 10. The gateway 30 is an example of a communication device. In the present embodiment, the gateway 30 collects sensor data and management data from the device 10 connected to the gateway 30, and transmits the collected sensor data and management data to the center server 50. An area in which the gateway 30 and the device 10 perform wireless communication (each of areas surrounded by ellipses in FIG. 1) is hereinafter referred to as a front area.

The center server 50 performs communication with the device 10 via the gateway 30 and collects the sensor data and the management data. The center server 50 is an example of an information processing device. The management data is data related to communication between the center server 50 and the device 10, that is, data used for failure analysis in a case in which a communication failure occurs between the center server 50 and the device 10 (for example, in the front area).

FIG. 2 is a diagram illustrating an example of a type of the management data. The management data includes, for example, hardware information, communication information, and peripheral information. The hardware information is information indicating an operation state of the hardware of the device 10, and includes a required time of each process, a usage rate of a central processing unit (CPU), and the like. The communication information includes information indicating a communication state between the device 10 and the gateway 30 such as a response time and a timeout error. The peripheral information includes information related to the device 10 or a surrounding environment in which the device 10 is installed such as a battery level and ambient temperature.

In the present embodiment, the center server 50 acquires sensor information including the sensor data collected by the gateway 30 via the network 40, and stores the acquired sensor information. Further, the center server 50 acquires management information including the management data collected by the gateway 30 via the network 40, and stores the acquired management information. Then, the center server 50 provides, for example, the stored sensor information to a processing device that performs a predetermined process on the basis of the sensor information. The center server 50 may function as a processing device that performs a predetermined process using the stored sensor information. Further, for example, the center server 50 manages the communication environment of the device 10 of the provider of the management information on the basis of the stored management information. Then, in a case in which a communication failure occurs in the device 10, the center server 50 analyzes a cause of the communication failure on the basis of the management information stored for the device 10 until now, and notifies the administrator or the like of the data processing system 1 of an analysis result.

FIG. 3 is a diagram schematically illustrating a transmission form of the management data according to the first embodiment. The device 10 and the gateway 30 are wirelessly connected, but a resource amount usable for transmission of data is decided in advance. Each device 10 transmits the sensor data and the management data to the gateway 30 within a range of a predetermined resource amount. In the failure analysis, there are many types of management data to be collected, and there may be management data which is large in consumption of radio resources used for transmission of the management data. Therefore, in a case in which there is no restriction on the use of resources, there are cases in which a lot of radio resources are used for transmission of the management data, and radio resources used for transmission of the sensor data are reduced. As a result, transmission omission of the sensor data may occur. The radio resources refer to radio resources specified by a combination of a predetermined frequency band and a time zone, for example, as illustrated in FIG. 3.

In this regard, in the first embodiment, a resource amount usable for transmission of the management data out of a resource amounts usable in each device 10 is decided in advance. In other words, a resource amount a usable of transmission of the sensor data with a margin out of an available resource amount in each device 10 is decided in advance. Then, a resource amount obtained by subtracting the resource amount a from the available resource amount in each device 10 is set as a resource amount b for transmission of the management data. For example, in FIG. 3, a width of an arrow corresponds to a size of the resource amount. In the present embodiment, the resource amount b used for transmission of the sensor data is set to be smaller than the resource amount a used for transmission of the management data for example, as illustrated in FIG. 3.

The gateway 30 of the present embodiment selects a collection manipulation for collecting the management data in accordance with an evaluation value which increases as a contribution degree to the failure analysis is larger and decreases as consumption resources are larger, and performs the selected collection manipulation on the device 10. In the present embodiment, the collection manipulation is, for example, a command for instructing the device 10 to transmit predetermined management data. Accordingly, the gateway 30 can collect the management data from the device 10 within the range of the resource amount b.

Further, in the present embodiment, the management data is collected with a plurality of cycles. For example, the management data which is high in the contribution degree to the failure analysis and small in the resource consumption at the time of collection is collected with a short cycle (that is, at a high frequency), and the management data which is low in the contribution to the failure analysis and large in the resource consumption at the time of collection is collected with a long cycle (that is, at a low frequency). Accordingly, the device 10 can transmit the management data within the range of the resource amount b and can reliably transmit the sensor data to the gateway 30 using the radio resources of the resource amount a.

Device 10

FIG. 4 is a diagram illustrating an example of the hardware of the device according to the first embodiment. The device 10 includes a sensor 11 and a computer 12. The sensor 11 detects temperature, humidity, rainfall, or the like. The computer 12 is an example of a control unit.

The computer 12 has a CPU 121, a read only memory (ROM) 122, a random access memory (RAM) 123, a wireless communication circuit 124, and an input/output interface (I/F) 125. The CPU 121, the ROM 122, the RAM 123, the wireless communication circuit 124, and the input/output interface 125 are mutually connected via a bus 126. The CPU 121 executes a predetermined process on the basis of a program stored in the ROM 122. The ROM 122 stores programs executed by the CPU 121 and constants and the like which are referred to by the CPU 121 while a program is being executed. The RAM 123 stores variables and the like which are referred to by the CPU 121 while a program is being executed.

The wireless communication circuit 124 performs wireless communication with the gateway 30 in accordance with a predetermined wireless communication standard. The input/output interface 125 exchanges signals with the sensor 11.

For example, upon receiving a command indicating transmission content or cycle of the management data from the gateway 30 through the wireless communication circuit 124, the CPU 121 acquires the management data in accordance with the received command. For example, in a case in which the management data designated by the command is data related to the device 10 such as the battery level, the CPU 121 acquires the management data from the ROM 122 or the RAM 123. Then, the CPU 121 transmits the acquired management data to the gateway 30 with the designated cycle through the wireless communication circuit 124. Further, in a case in which the management data designated by command is data measured by the sensor 11 such as the temperature, the CPU 121 controls the sensor 11 and acquires the management data from the sensor 11. Then, the CPU 121 transmits the acquired management data to the gateway 30 with the designated cycle through the wireless communication circuit 124.

In the first embodiment, resources for the sensor data and resources for the management data are secured for each device 10 in advance, and the sensor data and the management data are wirelessly transmitted using resources within each secured range. Therefore, it is possible to prevent the resources for the sensor data from being pressurized due to the transmission of the management data.

In each device 10, the ratio of the resource amount for the management data to the resource amount for the sensor data among the available resources may be changed in accordance with stability of the wireless environment of each device 10. For example, in a case in which the device 10 is installed in a harsh environment in which the wireless environment greatly varies in a short period of time, the ratio of the resource amount for the management data to the resource amount for the sensor data may be increased. On the other hand, in a case in which the device 10 is installed in a stable environment such as a radio environment which little fluctuation, the ratio of the resource amount for the management data to the resource amount for the sensor data may be decreased. Further, in each device 10, the ratio of the resource amount for the management data to the resource amount for the sensor data may be changed in accordance with a degree of importance of the sensor data viewed from a viewpoint of an application. For example, for the device 10 handling the sensor data having a high importance when viewed from a viewpoint of an application, it is desirable to recover the communication failure quickly, and thus the ratio of the resource amount for the management data to the resource amount for the sensor data may be increased. On the other hand, for the device 10 handling the sensor data having a low importance when viewed from the viewpoint of an application, the ratio of the resource amount for the management data to the resource amount for the sensor data may be decreased. Further, the available resource amount may be shared with other devices 10 therearound. For example, in order to secure the resource amount of the device 10 handling the sensor data with the high importance when viewed from the viewpoint of the application, the resource amount of the device 10 handling the sensor data having the low importance when viewed from the viewpoint of the application may be decreased. Besides, the ratio of the resource amount for the management data to the resource amount for the sensor data may be changed for each device 10 from an arbitrary viewpoint.

Gateway 30

Figure 5:
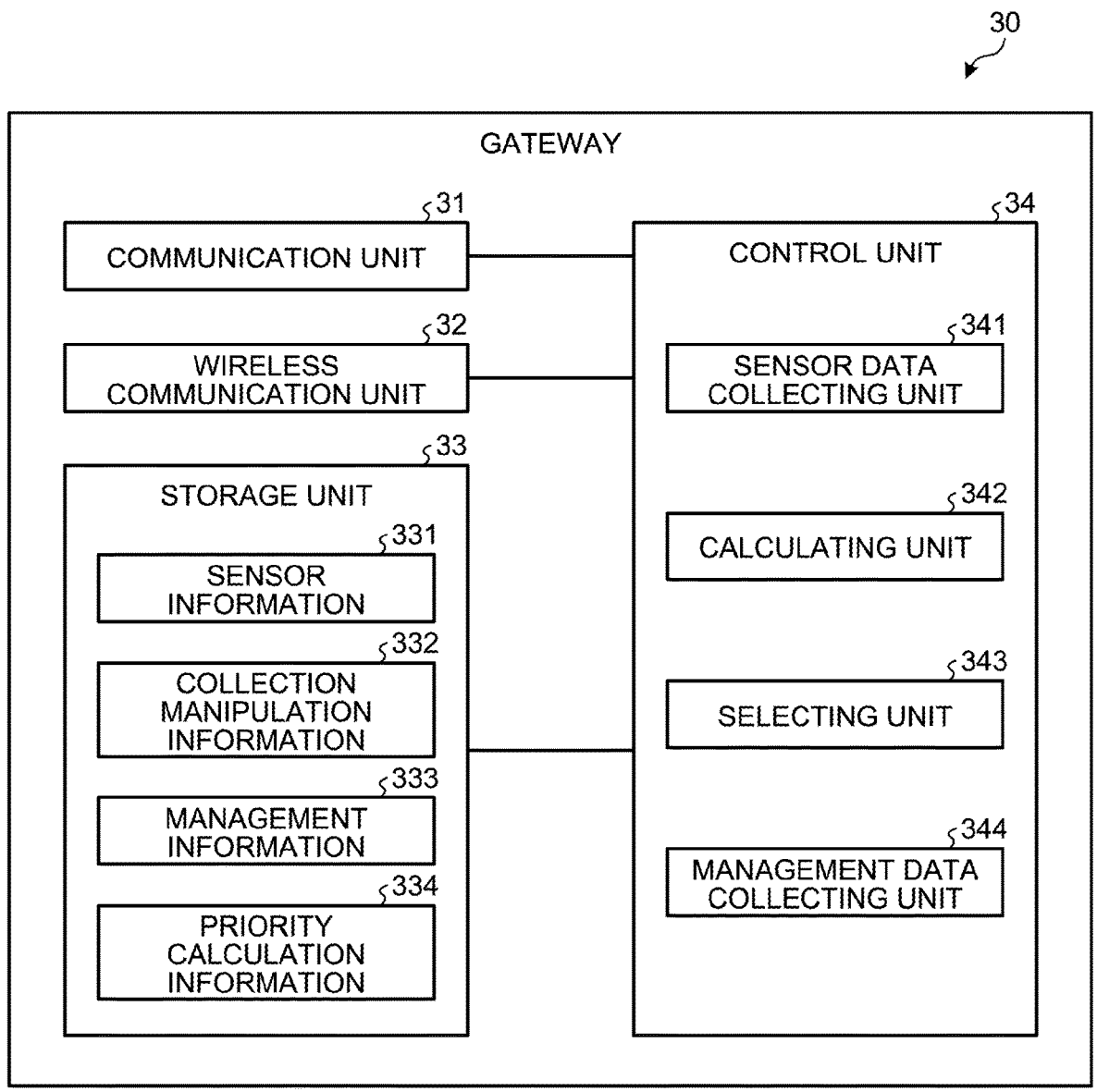
FIG. 5 is a block diagram illustrating an example of a gateway according to the first embodiment.

FIG. 5 is a block diagram illustrating an example of the gateway according to the first embodiment. The gateway 30 includes a communication unit 31, a wireless communication unit 32, a storage unit 33, and a control unit 34.

The communication unit 31 performs communication with the center server 50 via the network 40. The communication unit 31 is implemented through, for example, a network interface card (NIC).

The wireless communication unit 32 performs wireless communication with the device 10 in accordance with a predetermined wireless communication standard.

The storage unit 33 stores various kinds of information. The storage unit 33 is implemented by, for example, a solid state drive (SSD) or the like. The storage unit 33 stores sensor information 331, collection manipulation information 332, management information 333, and priority calculation information 334. The sensor information 331 includes the sensor data collected from each device 10. The sensor information 331 is, for example, information in which the collected sensor data is chronologically stored for each device 10.

FIG. 6 is a diagram illustrating an example of the collection manipulation information according to the first embodiment. The collection manipulation information 332 is information in which a type of management data collected by executing the collection manipulation and a resource amount consumed by transmission of the collected management data are associated with each other for each collection manipulation for collecting the management data. In the collection manipulation information 332 exemplified in FIG. 6, for example, it is indicated that a response time $x_1$ is collected as the management data in collection manipulation "PING", and resources of 1 channel×8 msec are consumed for transmission of the collected management data.

The management information 333 includes the management data collected from the device 10 by executing each collection manipulation included in the collection manipulation information 332. The management information 333 is, for example, information in which the collected management data is chronologically stored for each device 10.

The priority calculation information 334 is information used when the priority is calculated by a selection evaluation value calculation process to be described later. FIG. 7 is a diagram illustrating an example of the priority calculation information according to the first embodiment. The priority calculation information 334 is information in which a device of a transmission source of the management data of a corresponding type and the latest value, a minimum value, a maximum value, a difference, and a contribution degree of the management data of the corresponding type acquired from the device are associated each other for each type of management data. The contribution degree is a coefficient indicating a magnitude of a contribution to the failure analysis among a plurality of pieces of management data in a model used in the failure analysis. The minimum value, the maximum value, and the difference in the priority calculation information 334 are updated on the basis of the management data collected from the device 10 as needed. In an initial state before the management data is collected, initial values according to a property of the management data are set to the minimum value, the maximum value, and the difference in the priority calculation information 334.

In the present embodiment, the priority calculation information 334 includes the minimum value and the maximum value of each piece of management data, but as another example, the priority calculation information 334 includes two items among the minimum value, the maximum value, and the difference which is a difference between the maximum value and the minimum value. Further, the contribution degree of each piece of management data is calculated in advance by an administrator or the like of the data processing system 1 and registered in the priority calculation information 334 in each gateway 30. For example, the contribution degree may be calculated as a coefficient of each piece of management data when the evaluation function used for the failure analysis is approximated as a linear function of each piece of management data. For example, the contribution degree may be periodically updated using the management data collected from each device 10.

The control unit 34 controls the gateway 30 in general. The control unit 34 includes a sensor data collecting unit 341, a calculating unit 342, a selecting unit 343, and a management data collecting unit 344. The control unit 34 is implemented, for example, by a processor that executes a program read from a memory.

The sensor data collecting unit 341 collects the sensor data from the device 10 through the wireless communication unit 32 and stores the collected sensor data in the sensor information 331 of the storage unit 33. Further, the sensor data collecting unit 341 transmits the sensor information 331 in the storage unit 33 to a processing device that performs a predetermined process on the basis of the sensor information through the communication unit 31.

The calculating unit 342 calculates a selection evaluation value using a collection priority and a consumption resource amount for the collection manipulation of each piece of management data for each device 10 and generates a selection candidate list using the calculated selection evaluation value. The calculating unit 342 calculates a product of the contribution degree of the management data collected by executing the collection manipulation and the difference of the management data for each collection manipulation. Specifically, the calculating unit 342 calculates a collection priority A for each collection manipulation for each device 10 in accordance with, for example, the following Formula (1).

$$A = \sum_{i=1}^{N} k_i \cdot \Delta x_i \quad (1)$$

In Formula (1), $\Delta x_i$ indicates a difference of i-th management data in a predetermined certain period, $k_i$ indicates the contribution degree to the failure analysis, and N indicates the number of types of management data obtained by executing the collection manipulation. N=1 in a case in which the number of types of management data obtained by executing the collection manipulation is 1, and N=2 in a case in which the number of types of management data obtained by executing the collection manipulation is 2.

The difference $\Delta x_i$ is obtained from the difference between the maximum value and the minimum value in a predetermined certain period included in the management information 333. The contribution degree $k_1$ is set for each piece of management data in the priority calculation information 334. A length of the predetermined certain period is a value decided in accordance with a data period which is a contribution degree calculation target.

The collection priority A is an index indicating the priority of the collection manipulation for collecting the management data, and indicates that as the value of the collection priority A increases, a probability that the priority for collection of the management data is high is high. According to Formula (1), even if the contribution degree $k_1$ is large, if the difference $\Delta x_i$ is small, the value of the collection priority A is small. On the other hand, even if the contribution degree $k_1$ is small, if the difference $\Delta x_i$ is large, the value of the collection priority A may be large. For example, if the management data with the contribution degree $k_1$ of the same magnitude is considered, when the difference $\Delta x_i$ of the management data collected in a certain period is small, the change in the management data in a short period is regarded as being small, and thus the collection priority A is small. On the other hand, when the difference $\Delta x_i$ of the management data collected in a certain period is larger, since the change in the management data in a short period is large, it is desirable to collect the management data with a short cycle, and the collection priority A is large.

Here, in the collection of the management data, in a case in which the management data is transmitted from the device 10, if the resource amount consumed by transmission of the management data is large, resources allocated to the collection of other management data are decreased, and the collection efficiency of the management data deteriorates. For this reason, in a case in which the collection manipulation is selected, in addition to collection priority A, the resource amount consumed by transmission of the management data is considered. For example, for each collection manipulation, the calculating unit 342 adds the product of the contribution degree of the management data collected by executing the collection manipulation and the difference of the management data by the management data collected by executing the collection manipulation. Then, the calculating unit 342 calculates a value obtained by dividing a total value by the consumption resource amount used for the transmission of the management data collected by executing the collection manipulation as the selection evaluation value. Specifically, the calculating unit 342 calculates a selection evaluation value C in accordance with, for example, the following Formula (2).

$$C = A/B \quad (2)$$

In Formula (2), B indicates the resource amount consumed when the management data is transmitted from the device 10 by executing the collection manipulation.

Figures 8, 9:
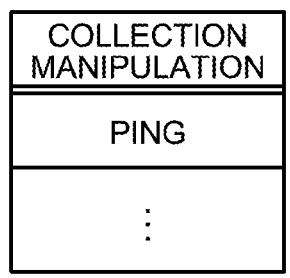
FIG. 8 is a diagram illustrating an example of a selection candidate list according to the first embodiment.
FIG. 9 is a diagram illustrating an example of a validation list according to the first embodiment.

The calculating unit 342 calculates the selection evaluation value C in accordance with Formula (2) for all the collection manipulations included in the collection manipulation information 332 and generates a selection candidate list in which combinations of the collection manipulation, the consumption resource amount, and the selection evaluation value C are listed. FIG. 8 is a diagram illustrating an example of the selection candidate list according to the first embodiment. The consumption resource amount when the management data is transmitted from the device 10 by executing the collection manipulation and the selection evaluation value calculated for the collection manipulation are included in the selection candidate list as items in association with the collection manipulation. For example, the consumption resource amount and the selection evaluation value calculated are stored for all the collection manipulations included in the collection manipulation information illustrated in FIG. 6. The calculating unit 342 generates the selection candidate list for each device 10. The selection evaluation value is an evaluation value indicating the priority of a plurality of collection manipulations for collecting the management data.

The selecting unit 343 selects the collection manipulation for a collection cycle of each piece of management data for each device 10. The collection cycle is, for example, a cycle for collecting the management data. For example, the selecting unit 343 selects the collection manipulation in the descending order of the selection evaluation values C in the selection candidate list within the range of the radio resources for the transmission of the management data allocated to the device 10 which is the management data collection target. Specifically, the selecting unit 343 selects the collection manipulation in the descending order of the selection evaluation values C in the selection candidate list so that a sum of the consumption resource amounts of the selected collection manipulations does not exceed an available resource amount, and registers the selected collection manipulation in a validation list. FIG. 9 is a diagram illustrating an example of the validation list according to the first embodiment. The validation list is a list including the selected collection manipulations and generated for each device 10.

Figures 10, 11:
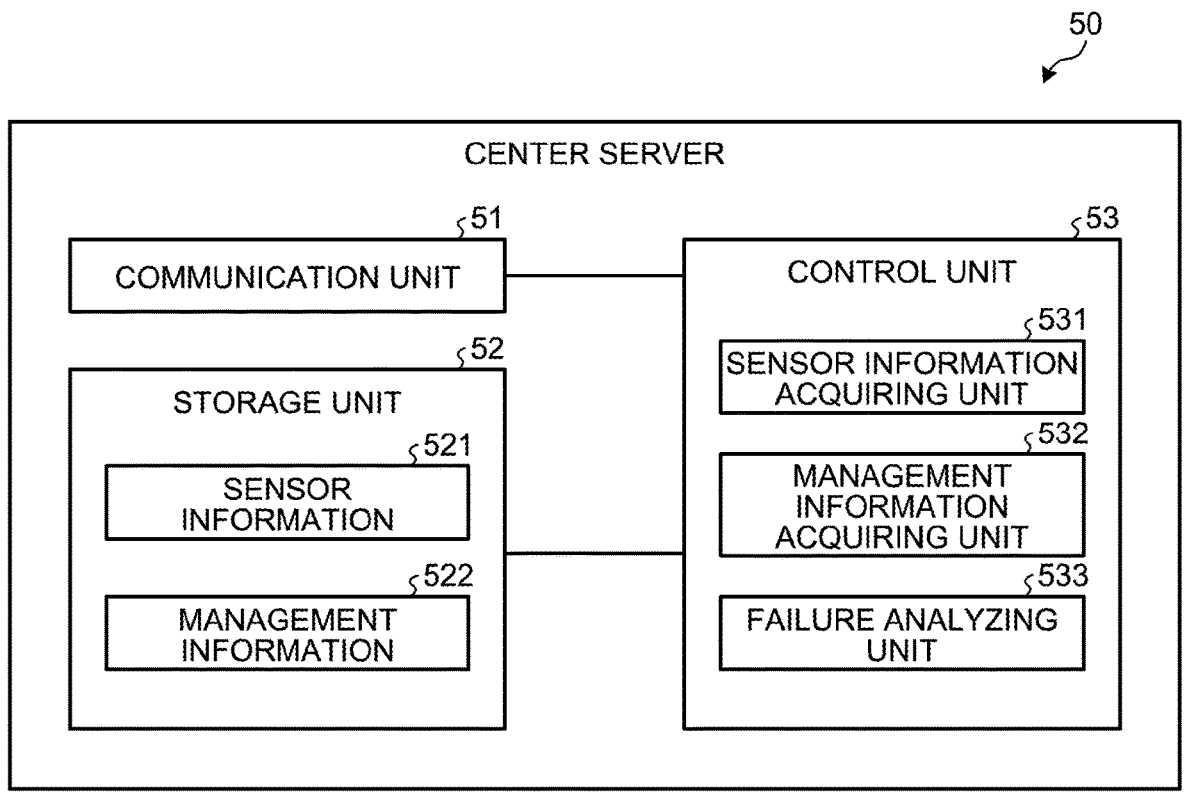
FIG. 10 is a diagram illustrating an example of an available resource amount set in a collection cycle according to the first embodiment.
FIG. 11 is a block diagram illustrating an example of a center server according to the first embodiment.

In the first embodiment, there are a plurality of collection cycles with which the collection manipulation is executed, and the selecting unit 343 executes the selection process before the collection manipulation is executed with each collection cycle. In the present embodiment, three collection cycles, for example, a first cycle with which collection is performed once a second, a second cycle with which collection is performed once a minute, and a third cycle with which collection is performed once an hour are decided in advance. Then, the available resource amount is set for each of the first cycle, the second cycle, and the third cycle. FIG. 10 is a diagram illustrating an example of the available resource amount set in the collection cycle according to the first embodiment. For example, as illustrated in FIG. 10, in the first cycle, the upper limit of the available resource amount is 10 msec per channel. Further, in the second cycle, the upper limit of the available resource amount is 500 msec per channel. Further, in the third cycle, the upper limit of available resource amount is 1000 msec per channel. The number of management data collection cycles may be two, or may be four or more. Further, in a case in which collection timings overlap in the respective collection cycles, the selecting unit 343 executes the selection process with priority on one with the short collection cycle.

The management data collecting unit 344 executes the collection manipulation for collecting the management data from the device 10 on the basis of the validation list generated by the selecting unit 343 and stores the management data collected from the device 10 in the storage unit 33 as the management information 333. The management data collecting unit 344 sequentially executes the collection manipulations for the device 10 included in the validation list. For example, in a case in which "PING" as a command corresponding to the collection manipulation is included in the validation list in the collection manipulation information illustrated in FIG. 6, a "PING" command will be executed. The device 10 transmits a response to the "PING" command to the gateway 30, and if the collection manipulation is the "PING" command, a round trip time for the "PING" command is the management data. Further, the management data collecting unit 344 updates the minimum value, the maximum value, and the difference in the priority calculation information 334 as needed on the basis of the management data stored in the management information 333. Further, the management data collecting unit 344 transmits the management information including the collected management data to the center server 50 through the communication unit 31.

Center Server 50

FIG. 11 is a block diagram illustrating an example of the center server according to the first embodiment. The center server 50 includes a communication unit 51, a storage unit 52, and a control unit 53.

The communication unit 51 has a function of communicating with the gateway 30 and an information processing device (not illustrated) owned by an administrator via the network 40. The communication unit 51 is implemented by, for example, an NIC.

The storage unit 52 stores various kinds of information. The storage unit 52 is implemented as, for example, an HDD or an SSD. The storage unit 52 stores sensor information 521 and management information 522. The sensor information 521 is information obtained by accumulating the sensor information 521 collected from each gateway 30 and includes a type of device 10, a type of sensor data, and a value of the sensor data. The management information 522 is information obtained by accumulating the management information 522 collected from each gateway 30 and includes a type of device 10, a type of management data, and a value of the management data.

The control unit 53 controls the center server 50 in general. The control unit 53 has a sensor information acquiring unit 531, a management information acquiring unit 532, and a failure analyzing unit 533. The control unit 53 is implemented by reading and executing a program stored in a memory such as a ROM through a processor such as a CPU. Specifically, the control unit 53 implements functions of the sensor information acquiring unit 531, the management information acquiring unit 532, and the failure analyzing unit 533. The control unit 53 may also be implemented by a hard-wired logic such as an ASIC or an FPGA.

The sensor information acquiring unit 531 acquires the sensor information 331 from the gateway 30 connected to the network 40 and stores the sensor information 331 in the sensor information 521 of the storage unit 52. Further, the control unit 53 transmits the sensor information 331 to a processing device that performs a predetermined process on the basis of the sensor information 331 through the communication unit 51.

The management information acquiring unit 532 acquires the management information 333 from the gateway 30 via the network 40 and stores the management information 333 in the management information 522 of the storage unit 52.

The failure analyzing unit 533 determines whether or not a failure occurs in the wireless communication between the gateway 30 and each device 10 using the management data in the management information 522. In a case in which a failure is determined to occur in the wireless communication between the gateway 30 and the device 10, the failure analyzing unit 533 analyzes a cause of the failure on the basis of the management information 522. Examples of the failure analysis include a random forest process of categorizing the state of the wireless communication from values of a plurality of pieces of management data and a regression analysis of calculating a coefficient of the function for calculating predetermined objective variables using a plurality of pieces of management data as independent variables.

Selection Evaluation Value Calculation Process

Figure 12:
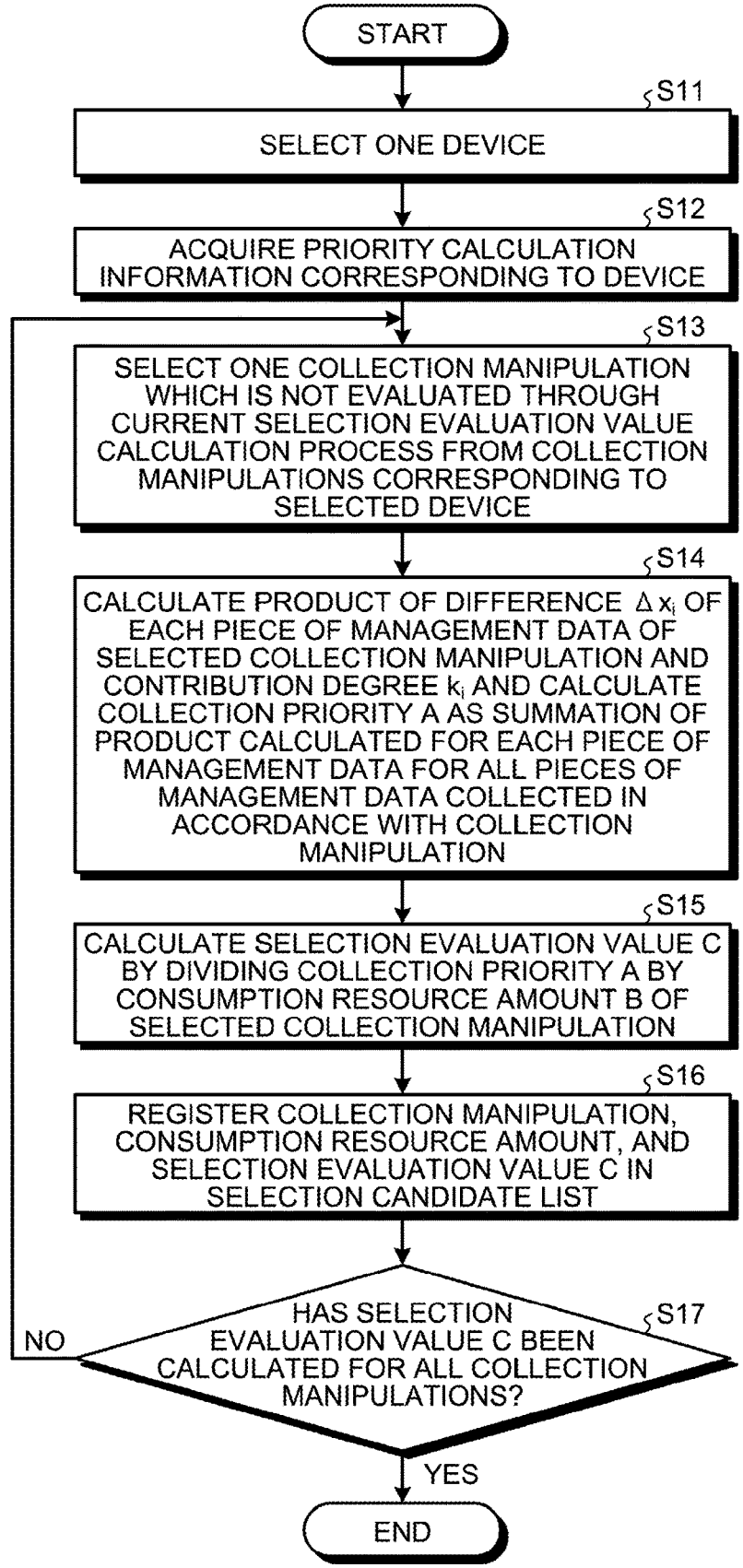
FIG. 12 is a flowchart illustrating an example of a selection evaluation value calculation process.

FIG. 12 is a flowchart illustrating an example of a selection evaluation value calculation process. The process illustrated in the flowchart of FIG. 12 is executed by the gateway 30. First, the calculating unit 342 of the gateway 30 selects one device 10 to undergo the selection evaluation value calculation process among the devices 10 connected to the gateway 30 (S11). Further, the calculating unit 342 acquires the priority calculation information 334 corresponding to the selected device 10 from the storage unit 33 (S12). The maximum value, the minimum value, the difference, and the contribution degree of the management data $x_1$ collected from each device 10 until now are included in the priority calculation information 334 for each device 10.

Then, the calculating unit 342 selects one collection manipulation which is not evaluated through the current selection evaluation value calculation process from the collection manipulations corresponding to the device 10 selected in Step S11 (S13). Then, the calculating unit 342 calculates the collection priority A in accordance with Formula (1) for each piece of management data $x_i$ collected by executing the selected collection manipulation (S14). Specifically, the calculating unit 342 calculates the product of the difference $\Delta x_i$ which is the difference between the maximum value and the minimum value of the management data collected by executing the collection manipulation selected in Step S13 and the contribution degree $k_i$. Then, the calculating unit 342 calculates the collection priority A as the summation of the product calculated for each piece of management data for all pieces of management data collected by executing the collection manipulation. For example, in a case in which the collection manipulation is "PING", the collected management data is the response time $x_1$, and the collection priority A of "PING" is $k_1 \times \Delta x_2$. Further, in a case in which the collection manipulation is "BEACON", the collected management data is a radio field strength $x_2$ and a link quality $x_3$, and the collection priority A of "BEACON" is $k_2 \times \Delta x_2 + k_3 \times \Delta x_3$.

Then, the calculating unit 342 calculates the selection evaluation value C by dividing the collection priority A calculated in Step S14 by the consumption resource amount B of the collection manipulation selected in Step S13 (S15). Then, the calculating unit 342 registers the collection manipulation, the consumption resource amount, and the selection evaluation value C in the selection candidate list (S16).

Then, the calculating unit 342 determines whether or not the selection evaluation value C has been calculated for all the collection manipulations corresponding to the device 10 selected in Step S11 (S17). In a case in which the selection evaluation value C has not been calculated for at least one collection manipulation (S17: No), the calculating unit 342 executes the process illustrated in Step S13 again. On the other hand, in a case in which the selection evaluation value C has been calculated for all the collection manipulations (S17: Yes), the selection evaluation value calculation process illustrated in the present flowchart ends.

Collection Manipulation Selection Process

Figure 13:
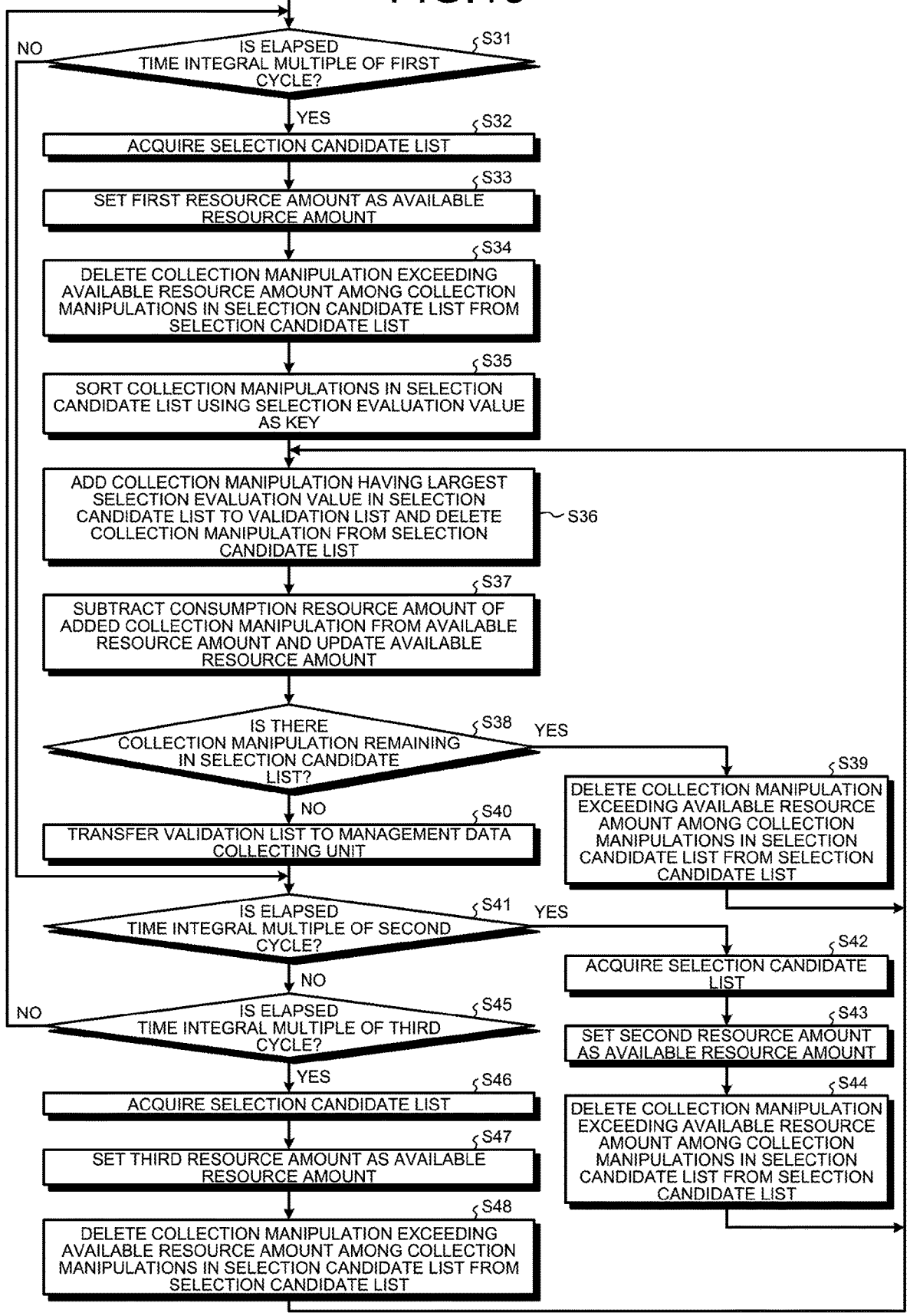
FIG. 13 is a flowchart illustrating an example of a collection manipulation selection process.

FIG. 13 is a flowchart illustrating an example of a collection manipulation selection process. The process illustrated in the flowchart of FIG. 13 is executed by the gateway 30. In the flowchart illustrated in FIG. 13, for example, a case in which the management data is collected with the first cycle, the second cycle, and the third cycle as illustrated in FIG. 10 will be described. In other words, the first cycle is a cycle per second, the second cycle is a cycle per minute, and the third cycle is a cycle per hour. The upper limit of the resource amount available in the first cycle is assumed to be a first resource amount (for example, 10 msec). Further, the upper limit of the resource amount available in the second cycle is assumed to be a second resource amount (for example, 500 msec). Further, the upper limit of the resource amount available in the third cycle is assumed to be a third resource amount (for example, 1000 msec).

First, the selecting unit 343 determines whether or not an elapsed time after the execution of the selection process at the beginning stage is an integral multiple of the first cycle (S31). In a case in which the elapsed time is not an integral multiple of the first cycle (S31: No), the process illustrated in Step S41 is executed. On the other hand, in a case in which the elapsed time is an integral multiple of the first cycle (S31: Yes), the selecting unit 343 acquires the selection candidate list (see FIG. 8) generated by the calculating unit 342 (S32). Then, the selecting unit 343 sets the first resource amount allocated to the transmission of the management data with the first cycle as the available resource amount (S33).

Then, the selecting unit 343 deletes a collection manipulation exceeding the available resource amount among the collection manipulations in the selection candidate list from the selection candidate list (S34). In other words, a record including the collection manipulation whose consumption resource amount exceeds the first resource amount is deleted from the selection candidate list. The selecting unit 343 sorts the collection manipulations in the selection candidate list using the selection evaluation value as a key so that the selection evaluation values are in the descending order (S35).

Then, the selecting unit 343 adds the collection manipulation having the largest selection evaluation value in the selection candidate list to the validation list and deletes the collection manipulation from the selection candidate list (S36). Further, the selecting unit 343 subtracts the resource amount consumed by the collection manipulation added to the validation list from the available resource amount, and updates the available resource amount (S37). In other words, a resource amount obtained by subtracting the resource amount consumed by the added collection manipulation from the first resource amount is a new available resource amount.

Then, the selecting unit 343 determines whether or not there is a collection manipulation remaining in the selection candidate list (S38). In a case in which there is a remaining collection manipulation (S38: Yes), the selecting unit 343 deletes a collection manipulation exceeding the available resource amount among the collection manipulations in the selection candidate list from the selection candidate list (S39). Then, the selecting unit 343 executes the process illustrated in Step S36 again. Accordingly, the above process is repeated until there is no collection manipulation in the selection candidate list.

On the other hand, in a case in which there is no remaining collection manipulation (S38: No), the selecting unit 343 transfers the validation list to the management data collecting unit 344 (S40). Then, the selecting unit 343 determines whether or not the elapsed time after the execution of the selection process at the beginning stage is an integral multiple of the second cycle (S41).

In a case in which the elapsed time is an integral multiple of the second cycle (S41: Yes), the selecting unit 343 acquires the selection candidate list generated by the calculating unit 342 (S42), and sets the second resource amount allocated to the transmission of the management data with the second cycle as the available resource amount (S43).

Then, the selecting unit 343 deletes a collection manipulation exceeding the available resource amount among the collection manipulations in the selection candidate list from the selection candidate list (S44). In other words, a record whose consumption resource amount exceeds the second resource amount is deleted from the selection candidate list. Then, the selecting unit 343 executes the process illustrated in Step S36 again. Accordingly, the process of S36 to S39 is repeated until there is no collection manipulation in the selection candidate list obtained in Step S44, and then Step S40 is executed. In Step S37, a resource amount obtained by subtracting the resource amount consumed by the added collection manipulation from the second resource amount is updated as a new available resource amount.

In a case in which the elapsed time is not an integral multiple of the second cycle (S41: No), the selecting unit 343 determines whether or not the elapsed time after the execution of the selection process at the beginning stage is an integral multiple of the third cycle (S45). In a case in which the elapsed time is not an integral multiple of the third cycle (S45: No), the selecting unit 343 executes the process illustrated in the Step S31 again. On the other hand, in a case in which the elapsed time is an integral multiple of the third cycle (S45: Yes), the selecting unit 343 acquires the selection candidate list generated by the calculating unit 342 (S46). Then, the selecting unit 343 sets the third resource amount allocated to the transmission of the management data with the third cycle as the available resource amount (S47).

Then, the selecting unit 343 deletes a collection manipulation exceeding the available resource amount among the collection manipulations in the selection candidate list from the selection candidate list (S48). In other words, a record whose consumption resource amount in the selection candidate list exceeds the third resource amount is deleted. Then, the selecting unit 343 executes the process illustrated in Step S36 again. Accordingly, the process of S36 to S39 is repeated until there is no collection manipulation in the selection candidate list obtained in Step S48, and then a process of Step S40 is executed. In Step S37, a resource amount obtained by subtracting the resource amount consumed by the added collection manipulation from the third resource amount is updated as a new available resource amount.

In Step S40, upon receiving the validation list, the management data collecting unit 344 executes the collection manipulation registered in the validation list on the device 10. When the collection manipulation included in the collection manipulation information 332 is executed, a command corresponding to the collection manipulation is transmitted to the device 10. Upon receiving the command from the gateway 30, the device 10 executes a process corresponding to the command. Accordingly, the management data collecting unit 344 can collect the management data corresponding to the collection manipulation.

As a result of executing the process illustrated in the flowchart of FIG. 13, there may be a collection manipulation which deviates from the validation list, that is, is postponed among the collection manipulations in the selection candidate list. In this case, a weight which increases as the number of times that the management data of the collection target is postponed increases may be added to the selection evaluation value C. Accordingly, the collection manipulation which is higher in the number of times of postponing is more likely to be selected in the next collection manipulation selection process. Here, in the example illustrated in FIG. 13, the validation lists are generated at a timing of the integral multiple of the first cycle, a timing of the integral multiple of the second cycle, and a timing of the integral multiple of the third cycle, but the weight need not be necessarily added to the management data which is double selected in the validation lists. Accordingly, it is possible to suppress the possibility of the management data which is not collected at all through the validation list selection of the collection manipulation selection process which is repeatedly performed.

Effects of First Embodiment

As apparent from the above description, the gateway 30 of the first embodiment includes the selecting unit 343 and the management data collecting unit 344. The selecting unit 343 selects the collection manipulation within the range not exceeding the resource amount allocated to the transmission of the management data among all the resources of the wireless communication usable by the device 10 in accordance with the evaluation value. The evaluation value is a value calculated on the basis of the contribution degree to the failure analysis and the consumption resources for each of a plurality of collection manipulations for collecting the management data used for the failure analysis from the device 10. The management data collecting unit 344 executes the collection manipulation selected by the selecting unit 343 on the device 10 and collects the management data corresponding to the collection manipulation from the device through wireless communication. Accordingly, it is possible to collect data with a higher evaluation value at a higher frequency than data with a lower evaluation value. As a result, there is an effect in that the gateway 30 can collect the management data useful for the failure analysis without narrowing the band of the sensor data originally transmitted by the device 10, and it is possible to improve the accuracy of the failure analysis. Particularly, in a case in which the radio resources allocated to each device 10 are small, it is possible to collect the management data useful for the failure analysis with a priority while securing the radio resources for transmitting the sensor data, and it is possible to improve the accuracy of the failure analysis.

Further, the gateway 30 of the present embodiment further includes the calculating unit 342. The calculating unit 342 calculates the evaluation value which increases as the contribution degree to the failure analysis increases, decreases as the consumption resources increase, and increases as the difference in the value of the management data collected by executing the collection manipulation increases for each collection manipulation. Accordingly, the management data which is large in the contribution degree, small in the consumption resources, and large in the difference is collected with a priority. Accordingly, it is possible to collect the management data useful for the failure analysis with priority without narrowing the band of the sensor data originally transmitted by the device 10, and it is possible to improve the accuracy of the failure analysis.

The calculating unit 342 of the present embodiment adds the product of the contribution degree of the management data collected in accordance with the collection manipulation and the difference of the management data by the management data collected by executing the collection manipulation for each collection manipulation. Then, the calculating unit 342 calculates a value obtained by dividing a total value by the consumption resource amount used for the transmission of the management data collected by executing the collection manipulation as the evaluation value. Accordingly, the small evaluation value is calculated for the management data which is small in the difference and large in the consumption resource amount, and the large evaluation value is calculated for the management data which is large in the difference and small in the consumption resource amount. Accordingly, it is possible to collect the management data useful for the failure analysis with priority without narrowing the band of the sensor data originally transmitted by the device 10, and it is possible to improve the accuracy of the failure analysis.

Further, in the present embodiment, the selecting unit 343 selects at least one collection manipulation for each of a plurality of collection cycles within the range of the resource amount decided in advance for each of a plurality of collection cycles. Further, the management data collecting unit 344 executes the collection manipulation selected by the selecting unit 343 with each of a plurality of different collection cycles. Accordingly, data with a high evaluation value is transmitted with a shorter cycle, and data with a lower evaluation value is transmitted with a longer cycle. Accordingly, it is possible to collect all types of management data needed for the failure analysis while suppressing frequent transmission of data which does not change much with the lapse of time.

Further, the center server 50 in the present embodiment acquires the management information including the management data from the gateway 30 via the network 40, and determines the presence or absence of the communication failure between the gateway 30 and the device 10 on the basis of the acquired management information. Accordingly, a processing load of the gateway 30 can be reduced as compared with a case in which the failure determination is performed on the gateway 30 side. Accordingly, it is possible to use a processor or the like having a low processing capability in the gateway 30, and it is possible to reduce the cost of the gateway 30.

[b] Second Embodiment

In the first embodiment, the example in which the selection evaluation value calculation process and the collection manipulation selection process are executed by the gateway 30 has been described. On the other hand, in a second embodiment, the selection evaluation value calculation process is executed by the center server 50. An overall configuration of a data processing system 1 in the second embodiment is similar as that in FIG. 1. The following description will proceed with parts different from the first embodiment.

Gateway 30

Figure 14:
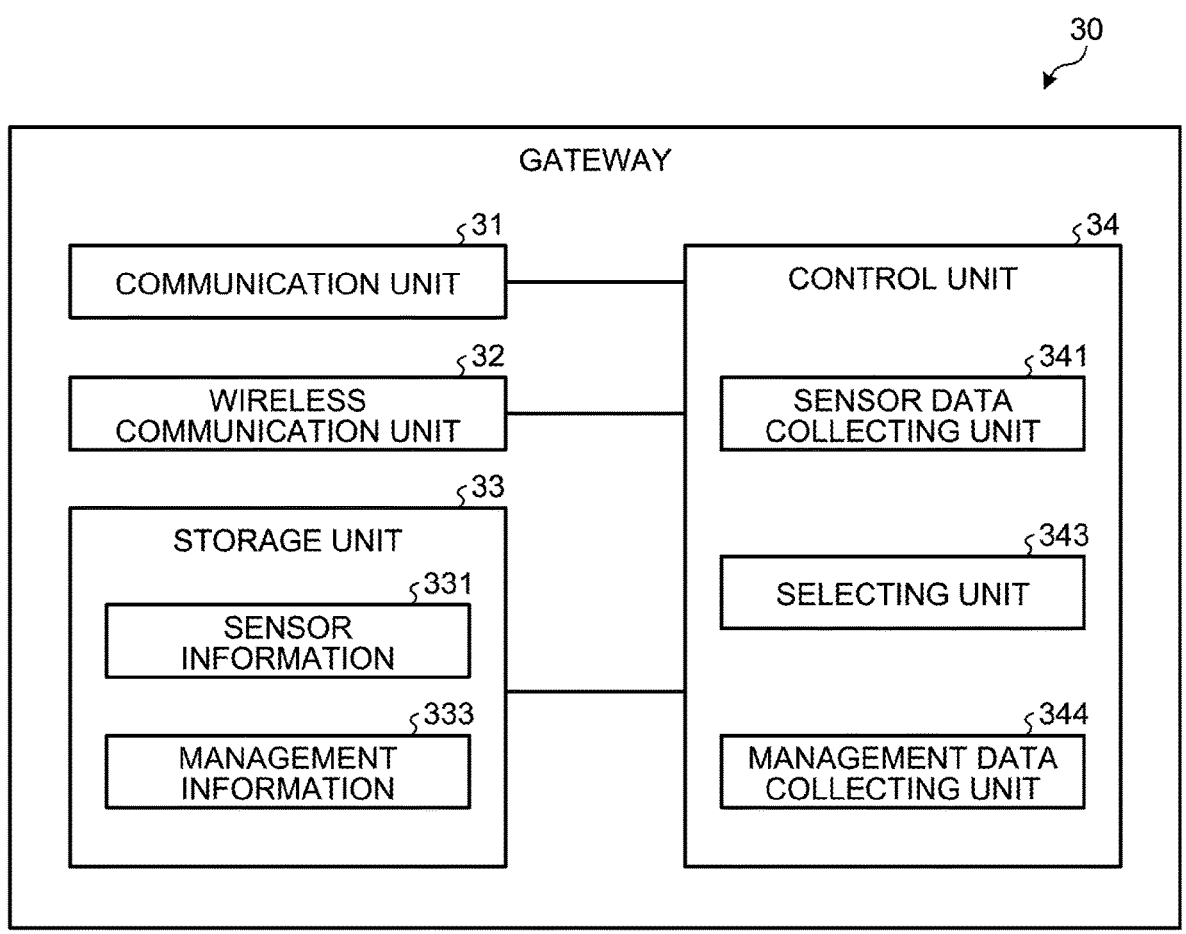
FIG. 14 is a block diagram illustrating an example of a gateway according to a second embodiment.

FIG. 14 is a block diagram illustrating an example of a gateway according to the second embodiment. For example, the gateway 30 in the present embodiment includes a communication unit 31, a wireless communication unit 32, a storage unit 33, and a control unit 34 as illustrated in FIG. 14. The storage unit 33 stores the sensor information 331 and the management information 333. The control unit 34 has a sensor data collecting unit 341, a selecting unit 343, and a management data collecting unit 344. The gateway 30 of the second embodiment illustrated in FIG. 14 differs from the gateway 30 of the first embodiment in that the collection manipulation information 332 and the priority calculation information 334 are not stored in the storage unit 33. Further, the gateway 30 of the second embodiment illustrated in FIG. 14 differs from the gateway 30 of the first embodiment in that the control unit 34 does not include the calculating unit 342. In other words, in the second embodiment, the gateway 30 does not perform the selection evaluation value calculation process.

Center Server 50

Figure 15:
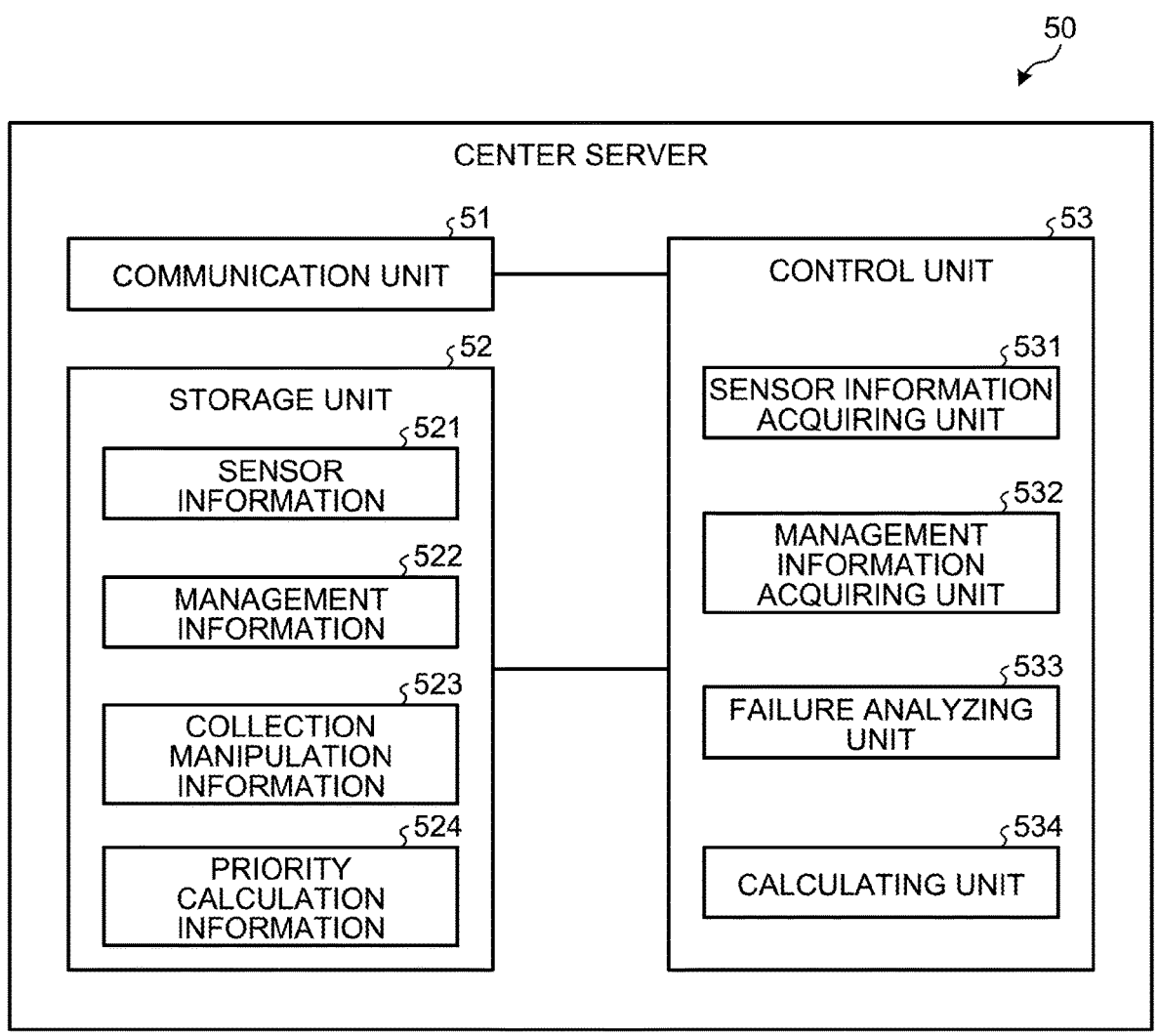
FIG. 15 is a block diagram illustrating an example of a center server according to the second embodiment.

FIG. 15 is a block diagram illustrating an example of the center server according to the second embodiment. The center server 50 in the present embodiment includes, for example, a communication unit 51, a storage unit 52, and a control unit 53 as illustrated in FIG. 15. The storage unit 52 stores the sensor information 521, the management information 522, collection manipulation information 523, and priority calculation information 524. The control unit 53 has a sensor information acquiring unit 531, a management information acquiring unit 532, a failure analyzing unit 533, and a calculating unit 534. The center server 50 of the second embodiment illustrated in FIG. 15 differs from the center server 50 of the first embodiment in that the collection manipulation information 523 and the priority calculation information 524 are stored in the storage unit 52. Further, the center server 50 of the second embodiment illustrated in FIG. 15 differs from the center server 50 of the first embodiment in that the control unit 53 has the calculating unit 534. The collection manipulation information 523 and the priority calculation information 524 are similar to the collection manipulation information 332 and the priority calculation information 334 described in the first embodiment. The calculating unit 534 is similar to the calculating unit 342 described in the first embodiment except that the calculating unit 534 has a function of transmitting the generated selection candidate list to the gateway 30.

In the present embodiment, the calculating unit 534 of the center server 50 executes the selection evaluation value calculation process. Since content of the selection evaluation value calculation process in the second embodiment is similar to the selection evaluation value calculation process explained in FIG. 12 of the first embodiment, description thereof is omitted.

Effects of Second Embodiment

The data processing system 1 in this second embodiment includes the gateway 30, the center server 50 connected to the gateway 30 via a network 40, and the device 10 wirelessly connected to the gateway 30. The center server 50 includes the calculating unit 534 that calculates the evaluation value on the basis of the contribution degree to the failure analysis and the consumption resources for each of a plurality of collection manipulations for collecting the management data used for the failure analysis. The gateway 30 includes the selecting unit 343 and the management data collecting unit 344. The selecting unit 343 selects the collection manipulation within the range not exceeding the resource amount allocated to the transmission of the management data among all the resources of the wireless communication usable by the device 10 in accordance with the evaluation value. The management data collecting unit 344 executes the collection manipulation selected by the selecting unit 343 on the device 10 and collects the management data corresponding to the collection manipulation from the device through wireless communication. Accordingly, it is possible to collect the management data having content similar to content in the case in which all pieces of management data are collected with the same cycle without narrowing the band of the sensor data originally transmitted by the device 10. As a result, it is possible to improve the accuracy of the failure analysis.

Further, in the present embodiment, the center server 50 calculates the selection evaluation value. Accordingly, the processing load of the gateway 30 can be reduced as compared with the case in which the failure determination is performed on the gateway 30 side. Therefore, it is possible to use a processor or the like having a low processing capability in the gateway 30, and it is possible to reduce the cost of the gateway 30.

In the above description of the second embodiment, the selection evaluation value calculation process is executed by the center server 50, but in addition to this, the collection manipulation selection process may be executed by the center server 50. In this case, the selecting unit 343 is removed from the control unit 34 of the gateway 30, while the selecting unit is installed in the control unit 53 of the center server 50. Even in a case in which the gateway 30 of the related art is used, it is possible to set the evaluation value which is proportional to the contribution degree to the failure analysis but inversely proportional to the consumption resources for each collection manipulation and collect the management data from device 10 in accordance with the evaluation value. Accordingly, when data is transmitted from the device 10 to the gateway 30 through wireless communication, it is possible to increase the accuracy of the failure analysis while securing the resources for the sensor data.

In the above description, the failure analyzing unit 533 is installed in the control unit 53 of the center server 50, but the failure analyzing unit 533 may be installed in the control unit 34 of the gateway 30.

Hardware

Figure 16:
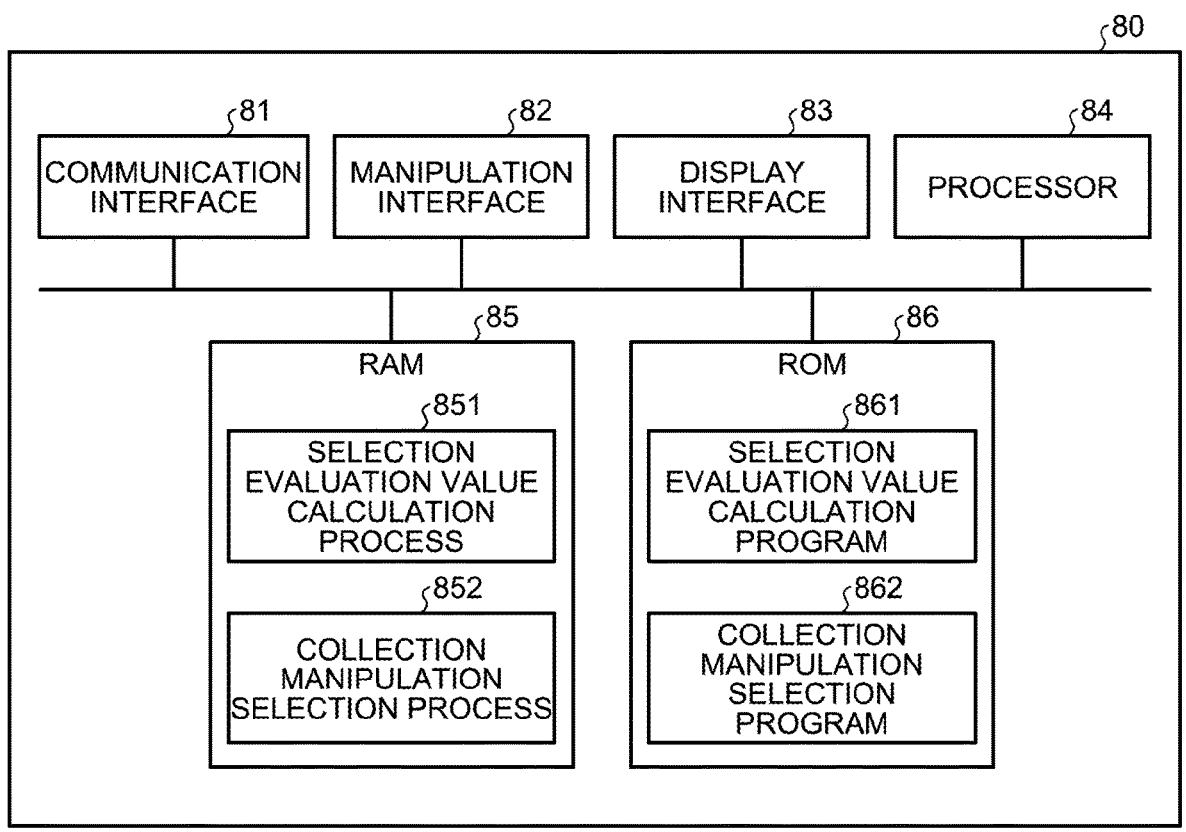
FIG. 16 is a diagram illustrating an example of hardware of a computer that implements a function of a gateway.

Various kinds of processes described in the above embodiments are implemented by executing a program prepared in advance through a computer. In this regard, an example of a computer that executes a program for implementing the functions of the gateway 30 and the center server 50 illustrated in each of the above-described embodiments will be described below. The following description will proceed with an example in which the selection evaluation value calculation process and the collection manipulation selection process are executed through the gateway 30 in accordance with the first embodiment. FIG. 16 is a diagram illustrating an example of hardware of the computer that implements the function of the gateway.

For example, a computer 80 includes a communication interface 81, a manipulation interface 82, a display interface 83, a processor 84, a RAM 85, and a ROM 86 as illustrated in FIG. 16. In addition to this, the computer 80 may have an HDD or the like.

For example, a selection evaluation value calculation program 861 in which a procedure of the selection evaluation value calculation process is described and a collection manipulation selection program 862 in which a procedure of the collection manipulation selection process is described are stored in the ROM 86 in advance as illustrated in FIG. 16. The processor 84 reads the selection evaluation value calculation program 861 or the collection manipulation selection program 862 from the ROM 86 and develops the read program onto the RAM 85. The selection evaluation value calculation program 861 or the collection manipulation selection program 862 may be appropriately integrated or separated. Further, in the case of each piece of data stored in the ROM 86, all pieces of data need not be necessarily stored in the ROM 86, and only data needed for processing may be stored in the ROM 86.

The processor 84 causes the selection evaluation value calculation program 861 to function as a selection evaluation value calculation process 851 and causes the collection manipulation selection program 862 to function as a collection manipulation selection process 852. The selection evaluation value calculation process 851 and the collection manipulation selection process 852 cause various kinds of data read from the ROM 86 to be developed onto an appropriately allocated area on the RAM 85 and execute various kinds of processes on the basis of various kinds of developed data.

In the gateway 30 in the above embodiments, the processor 84 reads the selection evaluation value calculation program 861 into the RAM 85 as the selection evaluation value calculation process 851 and executes the selection evaluation value calculation program 861, and thus the functions similar to those of the calculating unit 342 are executed. In the gateway 30 in the above embodiments, the processor 84 reads the collection manipulation selection program 862 into the RAM 85 as the collection manipulation selection process 852 and executes the collection manipulation selection program 862, and thus the functions similar to those of the selecting unit 343 are executed.

The computer 80 illustrates in FIG. 16 executes the processes executed in the gateway 30 illustrated in FIG. 5 or FIG. 14, for example, the processes illustrated in FIGS. 12 and 13. In the case of the processing units virtually implemented by the processor 84 of the computer 80, all the processing units need not be necessarily implemented by the processor 84, and a processing unit used for processing may be virtually implemented. Both the selection evaluation value calculation program 861 and the collection manipulation selection program 862 illustrated in FIG. 16 need not be necessarily stored in the ROM 86 from the beginning. For example, the computer 80 may obtain each program stored in a portable recording medium from a portable recording medium inserted into the computer 80 and execute the program. Examples of the portable recording medium include a compact disc-read only memory (CD-ROM), a digital versatile disk (DVD), a magneto-optical disk, and an integrated circuit (IC) card. Further, the computer 80 may acquire each program from another computer or server device storing each program via a communication line and execute the program. Examples of the communication line include a public line, the Internet, a LAN, and a wide area network (WAN).

It is possible to implement the failure analysis with a high degree of accuracy while securing resources of the sensor data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus, comprising:
a memory; and
a processor coupled to the memory, wherein
the processor executes a process comprising:
selecting a collection manipulation within a range not exceeding a resource amount allocated to transmission of management data among all resources of wireless communication usable by a device in accordance with an evaluation value calculated based on a contribution degree to failure analysis and consumption resources for each of a plurality of collection manipulations for collecting the management data used for the failure analysis from the device;
executing the collection manipulation selected by the selecting on the device; and
collecting the management data corresponding to the collection manipulation from the device through the wireless communication.

2. The communication apparatus according to claim 1, wherein the process further comprising:
calculating an evaluation value which increases as the contribution degree to the failure analysis increases, decreases as the consumption resources increase, and increases as a difference in a value of the management data collected by executing the collection manipulation increases for each of the collection manipulations.

3. The communication apparatus according to claim 2, wherein the calculating includes calculating a total value as summation of a product of the contribution degree of the management data collected by executing the collection manipulation and the difference of the management data by the management data collected by executing the collection manipulation for each collection manipulation, and calculating a value obtained by dividing the total value by a consumption resource amount used for the transmission of the management data collected by executing the collection manipulation as the evaluation value.

4. The communication apparatus according to claim 1, wherein the selecting includes selecting at least one collection manipulation for each of a plurality of collection cycles within a range of a resource amount decided in advance for each of the plurality of collection cycles, and
the executing includes executing the collection manipulation selected by the selecting with each of a plurality of different collection cycles.

5. A data processing system, comprising:
a communication apparatus;
an information processing apparatus connected to the communication apparatus via a network; and
a device wirelessly connected to the communication apparatus, wherein
the information processing apparatus includes:
a first memory; and
a first processor coupled to the first memory, wherein
the first processor executes a first process comprising:
calculating an evaluation value based on a contribution degree to failure analysis and consumption resources for each of a plurality of collection manipulations for collecting management data used for the failure analysis,
the communication apparatus includes:
a second memory; and
a second processor coupled to the second memory, wherein
the second processor executes a second process comprising:
selecting the collection manipulation within a range not exceeding a resource amount allocated to transmission of the management data among all resources of wireless communication usable by the device in accordance with the evaluation value;
executing the collection manipulation selected by the selecting on the device; and
collecting the management data corresponding to the collection manipulation from the device through the wireless communication, and
the device includes:
a third memory; and
a third processor coupled to the third memory, wherein
the third processor executes a third process comprising:
transmitting the management data to the communication apparatus in accordance with the collection manipulation executed by the communication apparatus.

6. A communication method, comprising:
selecting a collection manipulation within a range not exceeding a resource amount allocated to transmission of management data among all resources of wireless communication usable by a device in accordance with an evaluation value calculated based on a contribution degree to failure analysis and consumption resources for each of a plurality of collection manipulations for collecting the management data used for the failure analysis from the device, by using a processor in a communication apparatus; and
executing the selected collection manipulation on the device and collecting the management data corresponding to the collection manipulation from the device through the wireless communication, by using a processor in a communication apparatus.

* * * * *